United States Patent
Lee et al.

(10) Patent No.: US 12,500,304 B2
(45) Date of Patent: Dec. 16, 2025

(54) BATTERY MODULE INCLUDING CONNECTOR HAVING SHOCK ABSORBING STRUCTURE

(71) Applicant: LG Chem, Ltd., Seoul (KR)

(72) Inventors: Beak San Lee, Daejeon (KR); Junyeob Seong, Daejeon (KR); Jong Ryeol Oh, Daejeon (KR); Hee Yong Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1353 days.

(21) Appl. No.: 17/265,955

(22) PCT Filed: Feb. 25, 2020

(86) PCT No.: PCT/KR2020/002683
§ 371 (c)(1),
(2) Date: Feb. 4, 2021

(87) PCT Pub. No.: WO2020/175883
PCT Pub. Date: Sep. 3, 2020

(65) Prior Publication Data
US 2021/0296725 A1 Sep. 23, 2021

(30) Foreign Application Priority Data
Feb. 26, 2019 (KR) .......... 10-2019-0022718

(51) Int. Cl.
*H01M 50/211* (2021.01)
*H01M 50/204* (2021.01)
(Continued)

(52) U.S. Cl.
CPC ....... *H01M 50/211* (2021.01); *H01M 50/204* (2021.01); *H01R 13/24* (2013.01); *H01R 13/533* (2013.01); *H01M 50/284* (2021.01)

(58) Field of Classification Search
CPC .................................................. H01M 50/502
See application file for complete search history.

(56) References Cited

U.S. PATENT DOCUMENTS

| 8,546,040 B2 | 10/2013 | Yokoi |
| 9,017,857 B2 | 4/2015 | Lee et al. |
(Continued)

FOREIGN PATENT DOCUMENTS

| CN | 2772060 Y | 4/2006 |
| CN | 101783460 A | 7/2010 |
(Continued)

OTHER PUBLICATIONS

Machine translation of KR 20170050511 (Year: 2017).*
(Continued)

*Primary Examiner* — Maria Laios
(74) *Attorney, Agent, or Firm* — Lerner David LLP

(57) ABSTRACT

A battery module of the present disclosure includes: a cell assembly including at least one battery cell; a module case accommodating the cell assembly; and a module connector mounted on a mounting surface outside the module case, electrically connected to the cell assembly, and connectable to an external connector outside the module case. The module connector may include a body portion connected to a terminal coupled to the battery cell, and a fastening portion configured to have elasticity on one side of the body portion facing the mounting surface of the module case.

20 Claims, 6 Drawing Sheets

(51) Int. Cl.
  *H01M 50/284* (2021.01)
  *H01R 13/24* (2006.01)
  *H01R 13/533* (2006.01)

(56) References Cited

U.S. PATENT DOCUMENTS

| | | | |
|---|---|---|---|
| 10,361,408 | B2 | 7/2019 | Jeong et al. |
| 2002/0034895 | A1 | 3/2002 | Morita |
| 2009/0061301 | A1 | 3/2009 | Planck |
| 2009/0274946 | A1 | 11/2009 | Yokoi |
| 2010/0291434 | A1 | 11/2010 | Byun et al. |
| 2011/0039130 | A1 | 2/2011 | Baek et al. |
| 2011/0223466 | A1 | 9/2011 | Lee et al. |
| 2016/0087256 | A1 | 3/2016 | Wagner et al. |
| 2017/0040585 | A1 | 2/2017 | Park |
| 2018/0034013 | A1 | 2/2018 | Jeong et al. |
| 2020/0059020 | A1 | 2/2020 | Hammerschmied et al. |
| 2020/0295327 | A1 | 9/2020 | Onishi et al. |
| 2020/0381682 | A1 | 12/2020 | Haino et al. |

FOREIGN PATENT DOCUMENTS

| | | |
|---|---|---|
| CN | 101897056 A | 11/2010 |
| CN | 204144341 U | 2/2015 |
| CN | 106848675 A | 6/2017 |
| CN | 109119792 A | 1/2019 |
| CN | 208781900 U | 4/2019 |
| EP | 3605647 A1 | 2/2020 |
| EP | 3644458 A1 | 4/2020 |
| JP | 2002093393 A | 3/2002 |
| JP | 2005019305 A | 1/2005 |
| JP | 2010257735 A | 11/2010 |
| JP | 2011171987 A | 9/2011 |
| JP | 2012512516 A | 5/2012 |
| JP | 2016533009 A | 10/2016 |
| JP | 2018122725 A | 8/2018 |
| JP | 2019164976 A | 9/2019 |
| KR | 20090095642 A | 9/2009 |
| KR | 20100070170 A | 6/2010 |
| KR | 20100123067 A | 11/2010 |
| KR | 20140058916 A | 5/2014 |
| KR | 20170016743 A | 2/2017 |
| KR | 20170050511 A | 5/2017 |
| KR | 20180014553 A | 2/2018 |
| KR | 20180045837 A | 5/2018 |
| WO | 2019022098 A1 | 1/2019 |

OTHER PUBLICATIONS

Search report from International Application No. PCT/KR2020/002683, mailed Jun. 5, 2020.
Supplementary European Search Report for U.S. Appl. No. 20/762,754 dated Aug. 4, 2021. 2 pgs.
2 Search Report from Chinese Application No. 202080002920.0 dated Aug. 18, 2021. 3 pgs.

\* cited by examiner

[FIG. 1]
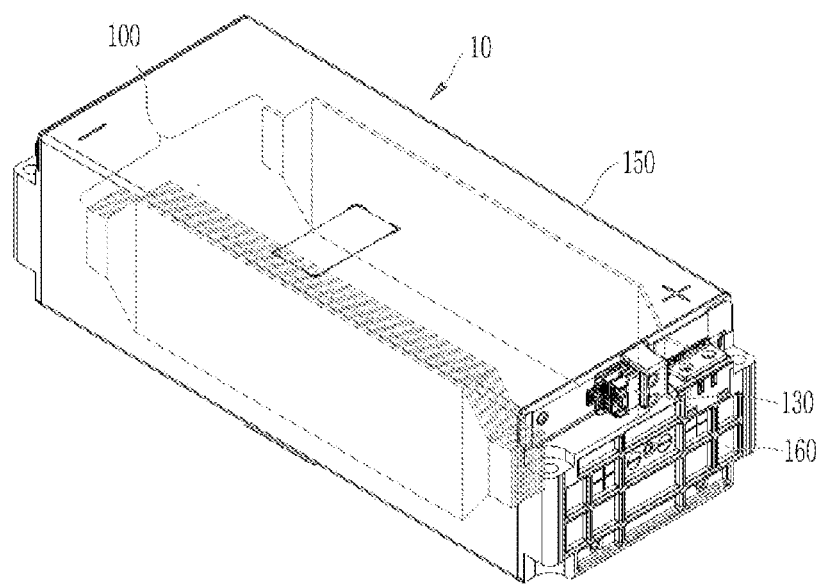

[FIG. 2]
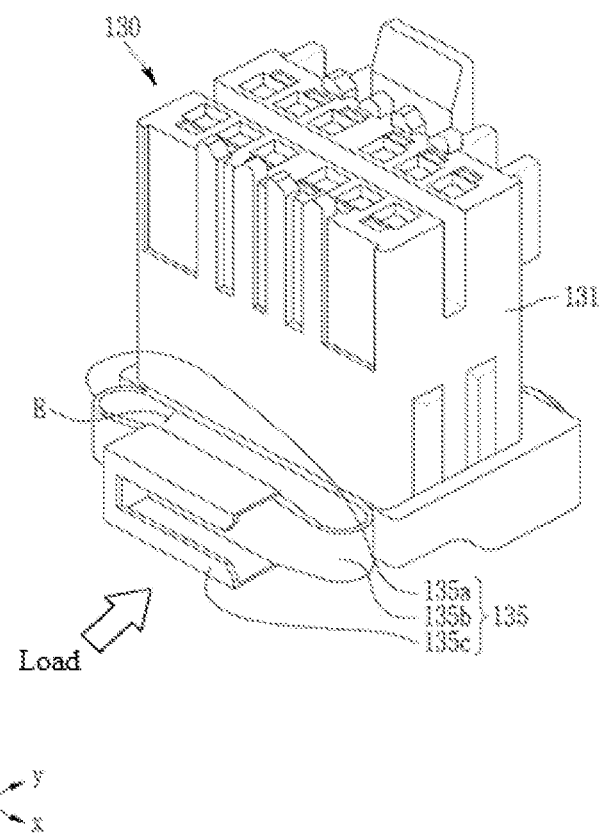

[FIG. 3]
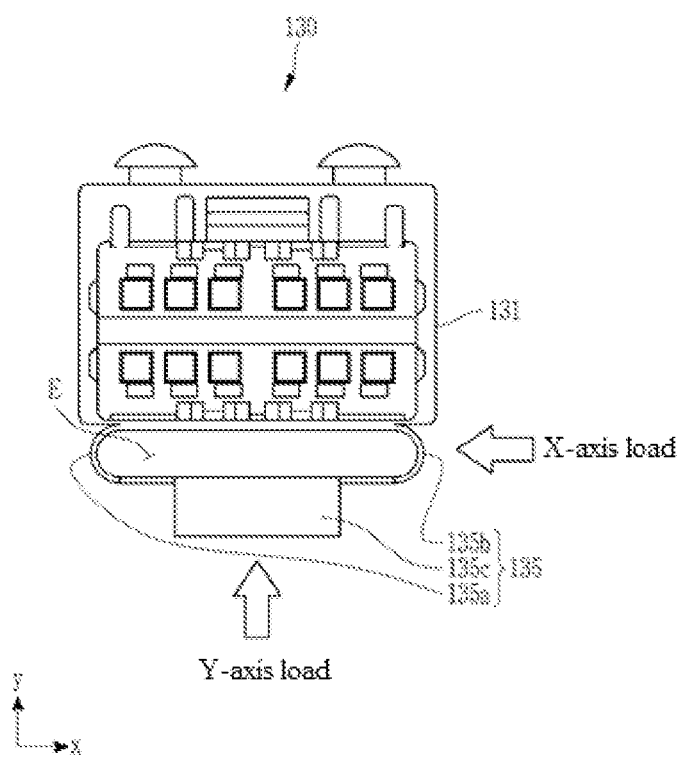

[FIG. 4]
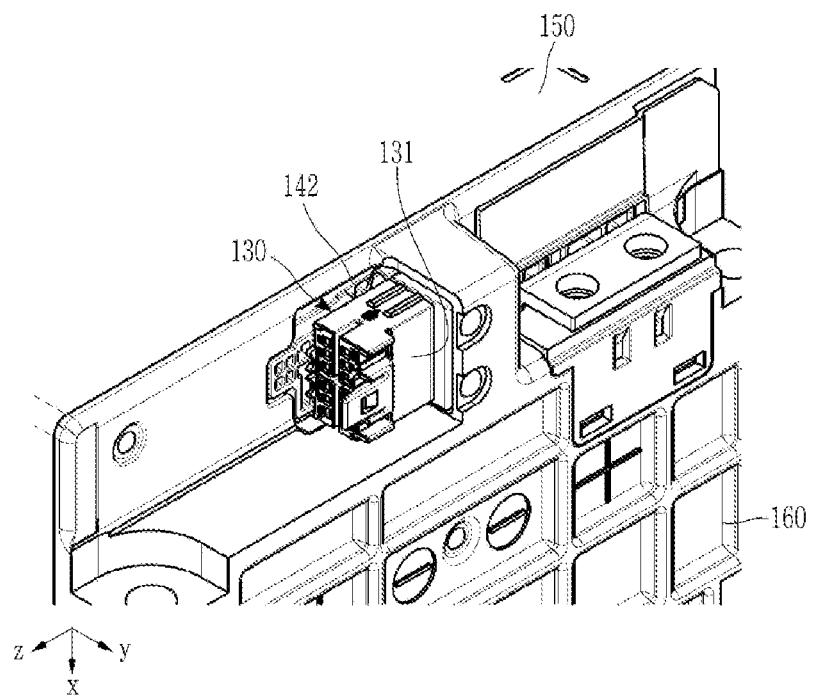

[FIG. 5]
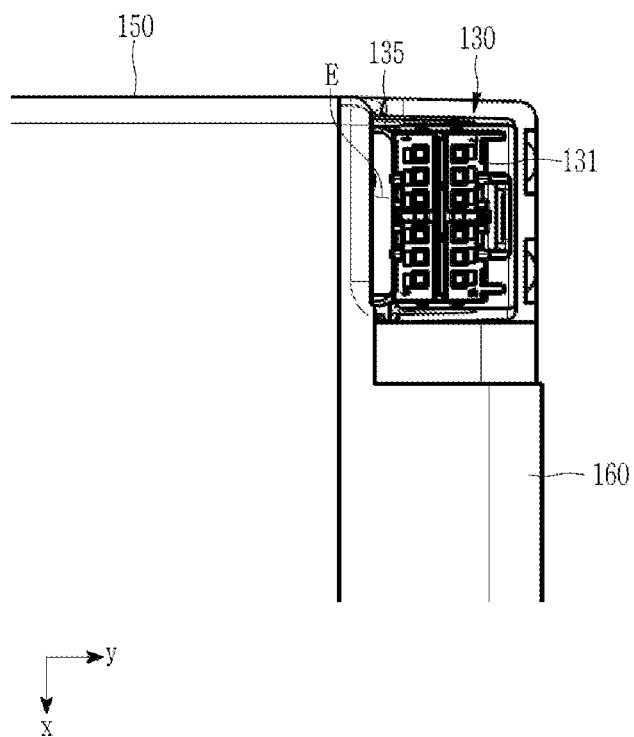

[FIG. 6]
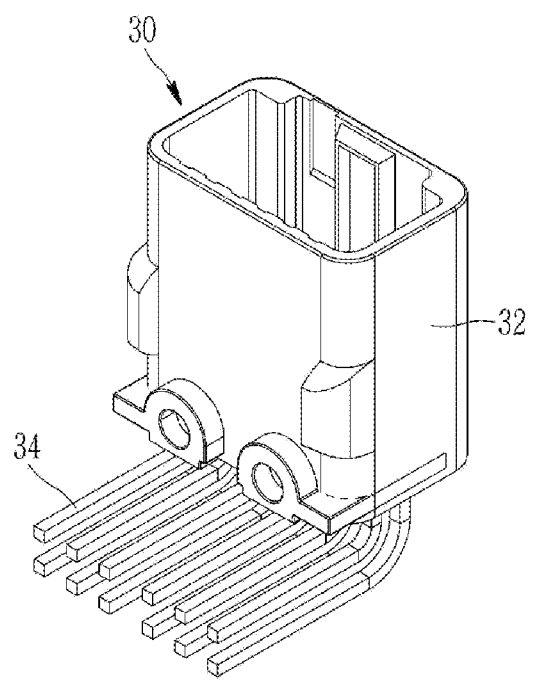

BATTERY MODULE INCLUDING CONNECTOR HAVING SHOCK ABSORBING STRUCTURE

CROSS-REFERENCE TO RELATED APPLICATIONS

This application is a national phase entry under 35 U.S.C. § 371 of International Application No. PCT/KR2020/002683, filed Feb. 25, 2020, which claims the benefit of Korean Patent Application No. 10-2019-0022718 filed on Feb. 26, 2019 with the Korean Intellectual Property Office, the disclosures of which are each incorporated herein by reference in its entirety.

TECHNICAL FIELD

The present disclosure relates to a battery module, and more particularly, to a battery module mounted with a module connector connecting to an external connector.

BACKGROUND ART

Since secondary batteries are easily applied to various product groups and has electrical characteristics such as high energy density, it is universally applied not only for a portable device but also for an electric vehicle (EV) or a hybrid electric vehicle (HEV), an energy storage system or the like, which is driven by an electric driving source. The secondary battery is attracting attention as a new environment-friendly energy source for improving energy efficiency since it gives a primary advantage of remarkably reducing the use of fossil fuels and also does not generate by-products from the use of energy at all.

A battery pack for use in electric vehicles has a structure in which a plurality of cell assemblies, each including a plurality of unit cells, are connected in series to obtain a high output. In addition, the unit cell can be repeatedly charged and discharged by electrochemical reactions among components, which include a positive electrode current collector, a negative electrode current collector, a separator, an active material, an electrolyte and the like.

Meanwhile, as the need for a large capacity structure is increasing along with the utilization as an energy storage source in recent years, there is a growing demand for a battery pack with a multi-module structure in which a plurality of battery modules, each including a plurality of secondary batteries connected in series and/or in parallel, are integrated.

When a plurality of battery cells are connected in series or in parallel to configure a battery pack, it is common to configure a battery module composed of at least one battery cell first, and then configure a battery pack by using at least one battery module and adding other components. The number of battery cells included in the battery pack, or the number of battery cells included in the battery module may be variously set according to the required output voltage or the demanded charge/discharge capacity.

The battery module includes a module case in which battery cells and various electrical parts are packaged, and a module connector connected to an external connector for electrical connection with an external device outside the module case. The external connector may be, for example, a connector for electrically connecting a plurality of battery modules.

The module connector provided in the existing battery module is securely fixed to the module case; and, therefore, when a battery module or a battery pack which is an assembly thereof is mounted and driven in a vehicle that is susceptible to vibrations or shocks, there was a fear that it could be broken without withstanding a load when receiving vibrations or shocks from the outside.

DETAILED DESCRIPTION OF THE INVENTION

Technical Problem

Therefore, it is an object of the present disclosure to provide a battery module having a module connector that imparts the elastic force capable of absorbing vibrations or shocks from the outside.

However, the problem to be solved by the embodiments of the present disclosure is not limited to the above-described problems, and can be variously expanded within the scope of the technical idea included in the present disclosure.

Technical Solution

A battery module according to one embodiment of the present disclosure comprises: a cell assembly including at least one battery cell; a module case accommodating the cell assembly; and a module connector mounted on a mounting surface outside the module case, electrically connected to the cell assembly, and connectable to an external connector outside the module case. The module connector may include a body portion connecting to a terminal coupled to the battery cell, and a fastening portion configured to have elasticity on one side of the body portion facing the mounting surface of the module case.

The fastening portion of the module connector may be configured to impart an elastic force in a first direction parallel to the mounting surface or in a second direction perpendicular to the mounting surface.

The fastening portion of the module connector may have a portion spaced apart from the body portion to form an empty space therebetween.

The fastening portion of the module connector may include at least one pair of elastic supports that are convexly bent outward.

The pair of elastic supports may have an elliptical shape when viewed from a third direction perpendicular to the first direction and the second direction.

The elliptical shape may be formed such that a width in the first direction is larger than that in the second direction.

The width of the pair of elastic supports spaced apart in the first direction may be equal to or smaller than a greatest width of the body portion measured in the first direction.

The module connector further includes a mounting end fastened to the mounting surface, and the pair of elastic supports may extend in a direction away from the body portion and be coupled to the mounting end at the end thereof.

The mounting end may be mounted on the mounting surface with a sliding insert structure.

The fastening portion of the module connector may be molded from a resin material.

According to another embodiment of the present disclosure, there can be provided a battery pack comprising the at least one battery module and a pack case packaging the at least one battery module.

According to still another embodiment of the present disclosure, there can be provided a device comprising the at least one battery pack.

Advantageous Effects

According to the embodiments, by providing a structure for imparting an elastic force to a portion where a module connector is fastened in the battery module, even if a vibration or shock is transmitted from the outside of the device mounted with the battery module, it can be absorbed.

Furthermore, by providing such a vibration or shock absorbing structure to the fastening portion of the module connector, it is effective in preventing the connection portion of the module connector from being loosened or damaged.

BRIEF DESCRIPTION OF THE DRAWINGS

FIG. 1 is a perspective view showing a battery module according to one embodiment of the present disclosure.

FIG. 2 is a perspective view showing a module connector mounted to a battery module according to one embodiment of the present disclosure.

FIG. 3 is a plan view of the module connector shown in FIG. 2.

FIG. 4 is an enlarged partial perspective view showing a state in which a module connector is mounted in a battery module according to one embodiment of the present disclosure.

FIG. 5 is an enlarged partial front view showing a state in which a module connector is mounted in a battery module according to one embodiment of the present disclosure.

FIG. 6 is a perspective view showing a connector mounted in a battery module according to the comparative example.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Further, throughout the specification, when a part is referred to as "including" a certain component, it means that it can further include other components, without excluding the other components, unless otherwise stated.

FIG. 1 is a perspective view showing a battery module according to one embodiment of the present disclosure.

Referring to FIG. 1, the battery module 10 according to the present embodiment includes a module connector 130 mounted on the outside of a module case 150 accommodating a cell assembly 100 therein. Battery cells constituting the cell assembly 100 may be provided as a pouch-type secondary battery, and a plurality of battery cells may be stacked and aligned in the cell assembly 100. The plurality of battery cells may be electrically connected to each other, and each of the battery cells may include an electrode assembly, a battery case accommodating the electrode assembly, and an electrode lead protruding out of the battery case and electrically connected to the electrode assembly.

The battery module 10 may include various electric components, and may include, for example, an internal circuit board (ICB) and a battery management system (BMS). Electric components such as the ICB and BMS board may be electrically connected to the plurality of battery cells.

The module case 150 forms the exterior of the battery module 10 and accommodates the cell assembly 100 therein; and a busbar assembly is coupled to at least one side or both sides of the cell assembly 100 positioned in a direction where the electrode leads of the cell assembly 100 extend, and an insulating frame 160 may be coupled to the outside of the busbar assembly. The busbar assembly may include a busbar frame disposed to cover the cell assembly 100, and a busbar fixed to the busbar frame. The busbar frame is composed of an insulator and includes a lead slot through which the electrode leads of the cell assembly 100 can pass. The busbar may electrically connect the electrode leads of the cell assembly 100.

The module connector 130 can be coupled to the busbar assembly, particularly the busbar frame. A mounting surface may be formed on the busbar frame, and the module connector 130 may be seated on the mounting surface and coupled thereto. In this case, the module connector 130 and the mounting surface may have sliding grooves formed on one of them and sliding protrusions formed on the other side so as to have a fastening structure in which they are inserted into each other by sliding.

Meanwhile, the battery module 10 may include a flexible printed circuit board (FPC) configured to sense the battery cells inside the module case 150. A terminal is coupled to the terminal portion of the flexible printed circuit board, and is exposed to the outside of the module case 150 and coupled to the module connector 130. Accordingly, the module connector 130 may be electrically connected to the cell assembly 100 through the flexible printed circuit board.

FIG. 2 is a perspective view showing a connector mounted to a battery module according to one embodiment of the present disclosure, and FIG. 3 is a plan view of the connector shown in FIG. 2.

Referring to FIGS. 2 and 3, the module connector 130 of the present embodiment includes a body portion 131 connected to a terminal and a fastening portion 135 used for mounting on the outside of the module case 150. The terminal is electrically connected to the battery cells through the flexible printed circuit board, and the flexible printed circuit board may be connected to the terminal through a terminal portion. Accordingly, the module connector 130 may transmit electrical and thermal data of each battery cell to a measurement and control machine such as a BMS.

The fastening portion 135 of the module connector 130 may be configured to have elasticity on one side of the body portion 131 facing the mounting surface of the module case 150, thus absorbing shocks or vibrations. In this case, the fastening portion 135 may be configured to impart elastic force in a first direction (x-axis direction) parallel to the mounting surface or in a second direction (y-axis direction) perpendicular to the mounting surface. Accordingly, the module connector 130 may be designed to impart an elastic force in the x-axis direction or in the y-axis direction according to the environmental conditions in which the module connector 130 is mounted, or may be also designed to impart an elastic force in both the x-axis direction and the y-axis direction. By providing the elastic force as described above, even if a load is applied in the x-axis direction or in the y-axis direction, the fastening portion 135 absorbs it to prevent the connection portion of the module connector 130 from being loosened or damaged.

In order to impart the elastic force in the x-axis direction or in the y-axis direction for the module connector 130, as shown in FIG. 3, the fastening portion 135 may be spaced apart from the body portion 131 to form an empty space E therebetween. In this case, the fastening portion 135 may include a pair of elastic supports 135a and 135b that are convex outwardly at both sides, wherein the elastic supports 135a and 135b extend in a direction away from the body portion 131 and are coupled to a mounting end 135c at a portion facing the body portion 131. As seen in FIG. 2, the mounting end 135c may have a rail groove and a receiving space so as to be slidably coupled to the mounting surface.

On the other hand, as shown in FIG. 3, the pair of elastic supports 135a and 135b are convexly bent outward in opposite directions from each other at both edges and extend from one surface of the body portion 131 to be integral with the mounting end 135c and, thus, form a closed curve. This forms an approximately elliptical shape when viewed in a third direction (z-axis direction) perpendicular to the x-axis direction and the y-axis direction, wherein the elliptical shape may have a width in the x-axis direction larger than that in the y-axis direction.

In addition, the width of the pair of elastic supports 135a and 135b spaced apart in the x-axis direction may be formed to be equal to or smaller than the width of the body portion 131. In other words, when in a normal state, the maximum width of the pair of elastic supports 135a and 135b measured in the x-axis direction may be less than or equal to the entire width of the body portion 131 measured in the same direction. Accordingly, even if a load in the x-axis direction or in the y-axis direction is applied to the module connector 130, the elastic supports 135a and 135b of the fastening portion 135 can protrude outside the region set by the edge of the body portion 131 to be prevented from interfering with the surrounding components.

The fastening portion 135 of the module connector 130 as described above may be manufactured by molding with a resin material. The elastic supports 135a and 135b and mounting end (135c) constituting the fastening portion 135 may be integrally formed through molding, and the fastening portion 135 may be integrally formed with the body portion 131.

FIG. 4 is an enlarged partial perspective view showing a state in which a module connector is mounted in a battery module according to one embodiment of the present disclosure, and FIG. 5 is an enlarged partial front view showing a state in which a module connector is mounted in a battery module according to one embodiment of the present disclosure.

Referring to FIG. 4, the module connector 130 may be aligned such that the body portion 131 faces outward and the fastening portion 135 faces the module case 150 incorporating the cell assembly therein, and be slidably coupled to the mounting surface 142 provided on the busbar assembly. Referring to FIG. 5, it can be seen that the fastening portion 135 of the module connector 130 forming the empty space E is in contact with and coupled to the module case 150. Therefore, the fastening portion 135 of the module connector 130 can absorb vibrations or shocks which are applied in a direction perpendicular to the main surface of the insulating frame 160 (y-axis direction), or vibrations or shocks which are applied in a direction being parallel to the main surface of the insulating frame 160 and being perpendicular to the ground (or the battery module seating surface) (x-axis direction).

In another embodiment of the present disclosure, a structure in which the elastic supports of the fastening portion 135 constituting the module connector 130 is formed in a plurality of pairs may be applied. That is, a plurality of elastic supports are provided on both left and right sides, respectively, and the elastic supports on both sides may be bent in opposite directions so as to be convex outwardly and thus form an elastic structure.

In yet another embodiment of the present disclosure, the elastic supports of the fastening portion 135 constituting the module connector 130 are formed in a pair or a plurality of pairs on both sides, and the elastic supports on both sides may be bent in directions facing each other so as to be convex inwardly and thus form an elastic structure.

FIG. 6 is a perspective view showing a module connector mounted in a battery module according to the comparative example.

The module connector 30 shown in FIG. 6 includes a fastening portion 34 extending from one side of the body portion 32 to which a terminal electrically connected to a battery cell is connected. The fastening portion 34 is composed of a plurality of pins so that it can be securely fixed to the mounting surface provided on the outside of the module case, wherein the plurality of pins are fixed in a cluster and, thus, are difficult to provide elastic force. Therefore, unlike the fastening portion of the module connector according to the present embodiment, when affected by vibration or shock from the outside, the fastening portion 34 may be damaged or irreversibly deformed because it cannot absorb the vibration or shock.

Meanwhile, one or more of the battery module according to an embodiment of the present disclosure may be packaged in a pack case to form a battery pack.

The above-mentioned battery module and battery pack comprising the same can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS AND SYMBOLS

10: battery module
100: cell assembly
130: module connector
131: body portion
135: fastening portions
135a, 135b: elastic support
135c: mounting end
142: mounting surface
150: module case
160: insulating frame

The invention claimed is:

1. A battery module comprising:
a cell assembly including at least one battery cell;
a module case accommodating the cell assembly; and
a module connector mounted on a mounting surface outside the module case, electrically connected to the cell assembly, and connectable to an external connector outside the module case,
wherein the module connector includes:
a body portion connected to a terminal coupled to the battery cell; and a fastening portion disposed between the body portion and the mounting surface of the module case and configured to have-provide elasticity on one side of the body portion facing the mounting surface of the module case.

2. The battery module of claim 1, wherein the fastening portion of the module connector is configured to impart an elastic force in a first direction parallel to the mounting surface or in a second direction perpendicular to the mounting surface.

3. The battery module of claim 2, wherein the fastening portion of the module connector has a portion spaced apart from the body portion to form an empty space therebetween.

4. The battery module of claim 2, wherein the fastening portion of the module connector includes at least one pair of elastic supports that are convexly bent outward.

5. The battery module of claim 4, wherein the pair of elastic supports have an elliptical shape when viewed from a third direction perpendicular to the first direction and the second direction.

6. The battery module of claim 5, wherein the elliptical shape is formed such that a width in the first direction is larger than that in the second direction.

7. The battery module of claim 4, wherein a width of the pair of elastic supports spaced apart in the first direction is equal to or smaller than a greatest width of the body portion measured in the first direction.

8. The battery module of claim 4, wherein the module connector further includes a mounting end fastened to the mounting surface, and
the pair of elastic supports extends in a direction away from the body portion and is coupled to the mounting end at the end thereof.

9. The battery module of claim 8, wherein the mounting end is mounted on the mounting surface with a sliding insert structure.

10. The battery module of claim 1, wherein the fastening portion of the module connector is molded from a resin material.

11. A battery pack comprising:
at least one of the battery modules according to claim 1; and
a pack case packaging the at least one battery module.

12. A device comprising at least one battery pack according to claim 11.

13. A battery module comprising:
a cell assembly including at least one battery cell;
a module case accommodating the cell assembly; and
a module connector mounted on a mounting surface outside the module case, electrically connected to the cell assembly, and connectable to an external connector outside the module case,
wherein the module connector includes:
a body portion connected to a terminal coupled to the battery cell; and
a fastening portion configured to provide elasticity on one side of the body portion facing the mounting surface of the module case, wherein the fastening portion of the module connector includes at least one pair of elastic supports that are convexly bent outward.

14. The battery module of claim 13, wherein the fastening portion of the module connector is configured to impart an elastic force in a first direction parallel to the mounting surface or in a second direction perpendicular to the mounting surface.

15. The battery module of claim 13, wherein the fastening portion of the module connector has a portion spaced apart from the body portion to form an empty space therebetween.

16. The battery module of claim 13, wherein the pair of elastic supports have an elliptical shape when viewed from a third direction perpendicular to the first direction and the second direction.

17. The battery module of claim 16, wherein the elliptical shape is formed such that a width in the first direction is larger than that in the second direction.

18. The battery module of claim 13, wherein a width of the pair of elastic supports spaced apart in the first direction is equal to or smaller than a greatest width of the body portion measured in the first direction.

19. The battery module of claim 13, wherein the module connector further includes a mounting end fastened to the mounting surface, and
the pair of elastic supports extends in a direction away from the body portion and is coupled to the mounting end at the end thereof.

20. The battery module of claim 19, wherein the mounting end is mounted on the mounting surface with a sliding insert structure.

* * * * *